United States Patent
Rytivaara et al.

(10) Patent No.: US 7,433,681 B2
(45) Date of Patent: Oct. 7, 2008

(54) METHOD AND DEVICE ARRANGEMENT FOR USING A TEXT MESSAGE TO CONTROL MULTIMEDIA DATA TO BE TRANSMITTED, AND A MULTIMEDIA SERVER USED IN THE METHOD

(75) Inventors: Markku Rytivaara, Oulu (FI); Mika Mustonen, Ii (FI); Kai Ojala, Oulu (FI); Keijo Lähetkangas, Oulu (FI); Kai Mustonen, Oulu (FI)

(73) Assignee: Nokia Corporation, Espoo (FI)

( * ) Notice: Subject to any disclaimer, the term of this patent is extended or adjusted under 35 U.S.C. 154(b) by 347 days.

(21) Appl. No.: 10/867,480

(22) Filed: Jun. 14, 2004

(65) Prior Publication Data
US 2004/0266463 A1    Dec. 30, 2004

(30) Foreign Application Priority Data
Jun. 27, 2003    (FI)    .................................. 20030957

(51) Int. Cl.
H04M 11/10    (2006.01)
H04Q 7/20    (2006.01)

(52) U.S. Cl. ..................................... 455/412.1; 455/445

(58) Field of Classification Search ................. 455/517, 455/519, 414.1, 536.1, 557, 466, 445, 412.1
See application file for complete search history.

(56) References Cited

U.S. PATENT DOCUMENTS

| 7,039,411 B2 * | 5/2006 | Purdy et al. ................. 455/445 |
| 2003/0064706 A1 * | 4/2003 | Ala-Luukko et al. ........ 455/412 |
| 2003/0104830 A1 * | 6/2003 | Norwood et al. ............ 455/517 |

FOREIGN PATENT DOCUMENTS

| WO | WO-02/03630 A1 | 1/2002 |
| WO | WO-03/053092 A1 | 6/2003 |

* cited by examiner

Primary Examiner—William D Cumming
(74) Attorney, Agent, or Firm—Harrington & Smith, PC

(57) ABSTRACT

The invention relates to a method, server and device arrangement for transmitting high-class multimedia messages of a mass event. When this method is utilized, the data transfer capacity of the cell of a cellular network serving the participants of the mass event need not be increased so that it would correspond to the capacity of the multimedia messages to be transmitted. In a method according to the invention, the cell that serves the mass event mainly transmits only text messages by which the multimedia messages to be sent from a multimedia server to some other terminal devices are defined.

13 Claims, 3 Drawing Sheets

METHOD AND DEVICE ARRANGEMENT FOR USING A TEXT MESSAGE TO CONTROL MULTIMEDIA DATA TO BE TRANSMITTED, AND A MULTIMEDIA SERVER USED IN THE METHOD

FIELD OF THE INVENTION

The invention relates to a method, server and device arrangement for transmitting a multimedia message of a mass event by means of a cellular network terminal device to a second terminal device. The invention also relates to a multimedia server used in the arrangement.

BACKGROUND OF THE INVENTION

Text messages transmitted with cellular phones, i.e. SMS (Short Message Service) messages are very popular among cellular phone users. By means of an SMS message, data in text form can be transmitted from a cellular network terminal device to another. SMS messages load the network very little. Only in some festival days, the SMS centres can get congested at times. The next generation in the development of this technology is represented by the multimedia message MMS (Multimedia Messaging Service). An MMS message can be used to transmit images, graphics, sound, audio samples and video samples. The most advanced cellular network terminals have the capabilities for producing images and video clips for transmission in MMS messages. The information content of the MMS messages thus requires higher data transfer capacity of the cellular network than the conventional SMS messages.

The change from SMS messages to MMS messages thus entails problems in some operating environments. One problematic usage situation/environment is an event that gathers a large number of participants. Examples of such mass events are concerts and sports competitions. If the participants of the events are using cellular network terminal devices that can create MMS messages, the MMS messages sent during the mass event can use all the transfer capacity available in the cell of the cellular network serving the mass event. This is seen by the sender of the message as poor operation of the network; the created MMS message cannot be sent or it has a long transmission delay. In particular, the transmission of video clips can completely block the cellular network used in connection with such mass events.

Another problem of the sender is the unsatisfactory quality of the image or video included in the MMS message. The sender of the message probably has to take the image or video at a long distance from the target. The quality of the image or video can therefore be unsatisfactory. Naturally, the sender of the MMS message is not happy with the situation.

SUMMARY OF THE INVENTION

It is an objective of the present invention to provide a method and a device arrangement, by means of which a large number of high quality MMS messages can be transmitted simultaneously in various mass events without blocking the cellular network.

The objectives of the invention are achieved with a device arrangement in which the organizer of a certain mass event continuously saves multimedia data suitable for MMS messages, such as images and video clips, into a server at his disposal. From the server used, there is a high-capacity data transfer connection to the core network of the cellular network. A participant of the mass event sends an SMS message to the multimedia server according to the invention with his own cellular network terminal device, when he wants to send one of the MMS messages in the server forward. In the SMS message, the participant tells to which terminal device he wants the certain MMS message in the server to be sent. The SMS message sent by the participant may include data which is added to the MMS message sent from the server.

An advantage of the invention is that the cellular network cell being used is not blocked, although the number of MMS messages sent from the mass event is large compared to the service capacity of the cell. The MMS capacity of an individual cell of the serving cellular network can thus be increased by means of the invention without large extra investments.

In addition, an advantage of the invention is that the images and video clips sent in the MMS messages are of higher quality than corresponding captures taken with individual cellular network terminal devices.

Furthermore, an advantage of the invention is that by means of it MMS messages can also be transmitted with such a terminal device which is not capable of producing/transmitting a MMS message itself.

Yet another advantage of the invention is that it gives the organizer of the event an opportunity to sell the multimedia material already during the event.

The method according to the invention for transmitting a multimedia message about a mass event is characterized in that data used for the multimedia message is saved in a multimedia server at the disposal of the organizer of the mass event and connected to the cellular network a message is sent with a first terminal device to said multimedia server for transmitting a multimedia message defined in the message to a second terminal device.

a multimedia message defined by the message is formed in the multimedia server, and the multimedia server transmits the created multimedia message to the second terminal device specified by the first terminal device in its message.

The device arrangement according to the invention for transmitting a multimedia message about a mass event is characterized in that in the device arrangement data used for the multimedia message has been saved in a multimedia server at the disposal of the organizer of the mass event and connected to the cellular network a message sent by a first terminal device to said multimedia server has been arranged to define a multimedia message to be transmitted to a second terminal device the multimedia server has been arranged to produce a multimedia message defined by the message sent by the first terminal device, and the multimedia server has been arranged to transmit the multimedia message produced by it to the second terminal device specified by the first terminal device in said message.

The multimedia server that transmits multimedia data according to the invention is characterized in that it comprises a means for receiving a message from a cellular network terminal device, in which message a multimedia message to be transmitted to a second terminal device is specified a means for producing the multimedia message specified by the message, and a means for transmitting the produced multimedia message to said second terminal device using a cellular network at least partly.

Some preferred embodiments of the invention are described in the dependent claims.

The basic idea of the invention is the following: An organizer of a mass event produces multimedia data suitable for an MMS message, which data is saved in real time in a multimedia server according to the invention. This multimedia data can be, for example, high-quality sound, images, live video, a saved video clip, video slowdown, enlarging or panoraming. A participant of the mass event can transmit these multimedia blocks that are suitable for use in an MMS message from the server according to the invention by sending an SMS message to the multimedia server. In this SMS message it is defined what kind of an MMS message is transmitted, to which telephone number it is transmitted and whether some user-specific data is added to the MMS message to be transmitted. The multimedia server according to the invention transmits an MMS message defined in the SMS message via the core network of the cellular network to a desired terminal device. In the method according to the invention, preferably only SMS messages are utilized in the radio path of the cellular network at the place of the mass event, because the overall load caused by SMS messages in one cell of the cellular network is much smaller than that of MMS messages. The actual MMS messages that require data transfer capacity are transferred via a data transfer connection with higher capacity to the recipient of the MMS message. This high-capacity connection can also be a fixed data transfer connection. By means of the method and arrangement according to the invention, it is thus possible to avoid the blocking of the radio path of an individual cell of a cellular network in a mass event in which a large number of MMS messages are transmitted. In addition, by means of the invention it is possible to ensure that the MMS message to be transmitted is always first-class quality.

BRIEF DESCRIPTION OF THE DRAWINGS

In the following, the invention will be described in more detail. Reference will be made to the accompanying figures, in which.

DETAILED DESCRIPTION

Figure 1:
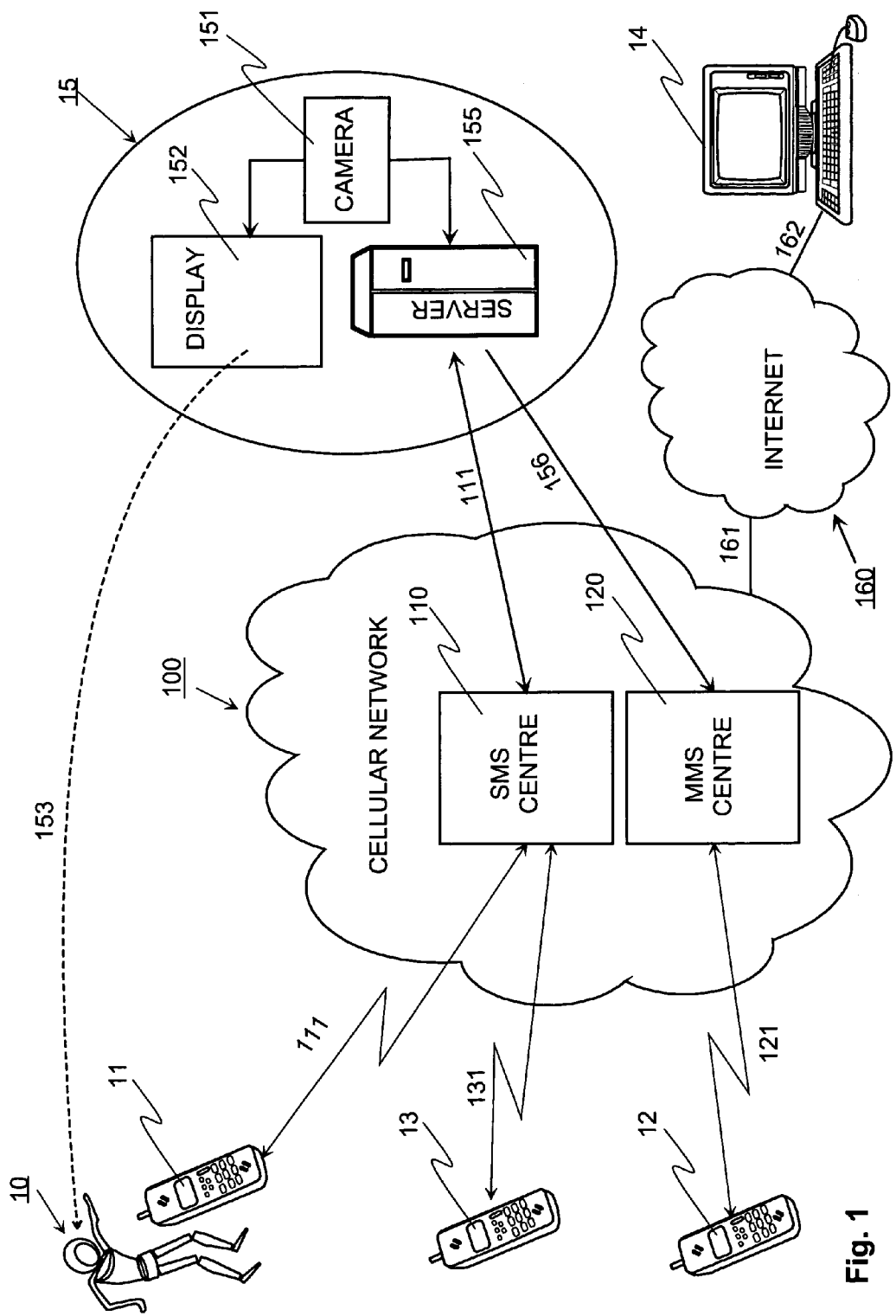
FIG. 1 shows an embodiment of a device arrangement according to the invention by way of example.

FIG. 1 shows an example of a device arrangement according to the first embodiment of the invention. The device arrangement according to the invention can be advantageously applied in various mass events. Examples of such mass events are concerts and sports events. In such events, there may be tens of thousands of participants 10 at the same time. Each participant 10 can have a terminal device 11 operating in the cellular network 100 with them. The cellular network used 100 can be e.g. a GSM network (Global System for Mobile communications) or a GPRS network (General Packet Radio Service). Some of the participants may have terminal devices 11, by which it is possible to send MMS messages as well. If in such a mass event even a small part of the audience sends MMS messages, it will soon result in the blocking of data transfer in the cell being used, because the MMS messages require a relatively large amount of data transfer capacity.

The device arrangement according to invention improves the situation in the following manner. The mass event is arranged by a party 15. This party 15 has multimedia production means at his disposal: camera(s) 151 by which the event is filmed, a display device 152 by which the filmed material is shown, and a multimedia server 155, into which the filmed/created multimedia data is saved. In the method and arrangement according to the invention, the organizer 15 of the mass event offers this multimedia data saved in the multimedia server 155 for use by the participants 10 of the event. This multimedia data preferably comprises high-quality sound, images, live video, saved video clips, video slowdown, enlarging or panoraming. The multimedia server 155 need not necessarily be located on the place of the mass event or be owned by the organizer of the mass event.

In the first embodiment of the invention, the participant 10 of the event receives information 153 about this possibility from a message seen or heard on the display device 152. The display device 152 is preferably a large video display, which is used by the organizer 15 of the event. If the event is a match of some ball game, the above mentioned message on the display device 152 can be the following, for example: "Send the goal just seen as a video/image to your friend by sending a SMS message to one of the following numbers: no. 1234567 SMS message or no. 7654321 MMS message. You can also add your own comments". The participant 10 of a mass event thus need not try to produce MMS data of the event himself, but he can utilize the first-class multimedia data produced by the organizer 15 of the event. For sending the selected multimedia data, the participant only needs to send one SMS message to the telephone number given by the organizer of the event.

The SMS message of the participant 10 is transmitted via a radio link 111 to the core network of the cellular network 100 used. This core network of the cellular network 100 also includes structural parts not shown in FIG. 1, such as base stations and centres. In the cellular network 100, the SMS message sent by the participant 10 is finally directed to a SMS centre 110. The SMS centre 110 directs the sent SMS message from the cellular network 100 to the multimedia server 155 of the organizer 15 of the event via a data transfer connection 111 between them.

The multimedia server 155 according to the invention receives the SMS message sent by the participant 10. It interprets which piece and what kind of multimedia data is meant and to which number it should be transmitted. When these matters have been interpreted, the multimedia server 155 sends the multimedia data requested either as an SMS message via a data transfer connection 111 to the SMS centre 110 or as an MMS message via the data transfer connection 156 to the MMS centre 120. In the example of FIG. 1, these message centres are drawn as separate centres for clarity, but naturally they can also be one entity.

It is also possible to transmit multimedia data as a POP message (Post Office Protocol), whereby it becomes an e-mail attachment file. This is a advantageous embodiment especially in the cases where the size of the MMS message grows large, such as over 100 kilobytes.

If the message is to be transmitted as an SMS message to the terminal device 13, which cannot receive multimedia messages, the message is directed from the SMS centre 110 via the cellular network 100 to the radio path 131, from which it arrives at the terminal device 13. The transmitted SMS message can thus be seen on the display of the terminal device 13.

If the message can be transmitted as a MMS message to the terminal device 12, which can interpret multimedia messages, the message is directed from the MMS centre 120 via the cellular network 100 to the radio path 121, from which it arrives at the terminal device 12. This terminal device 12 can present the whole multimedia message it has received.

The receiving terminal device can also be other than an actual terminal device of the cellular network 100. In the example of FIG. 1, a computer 14 is connected by a data transfer connection 162 to the Internet 160. The cellular network 100 and the Internet 160 exchange messages via the data transfer connection 161. It is thus also possible to transfer a MMS message from the multimedia server 155 to a computer 14, in which it can be seen, heard or read.

Figure 2:
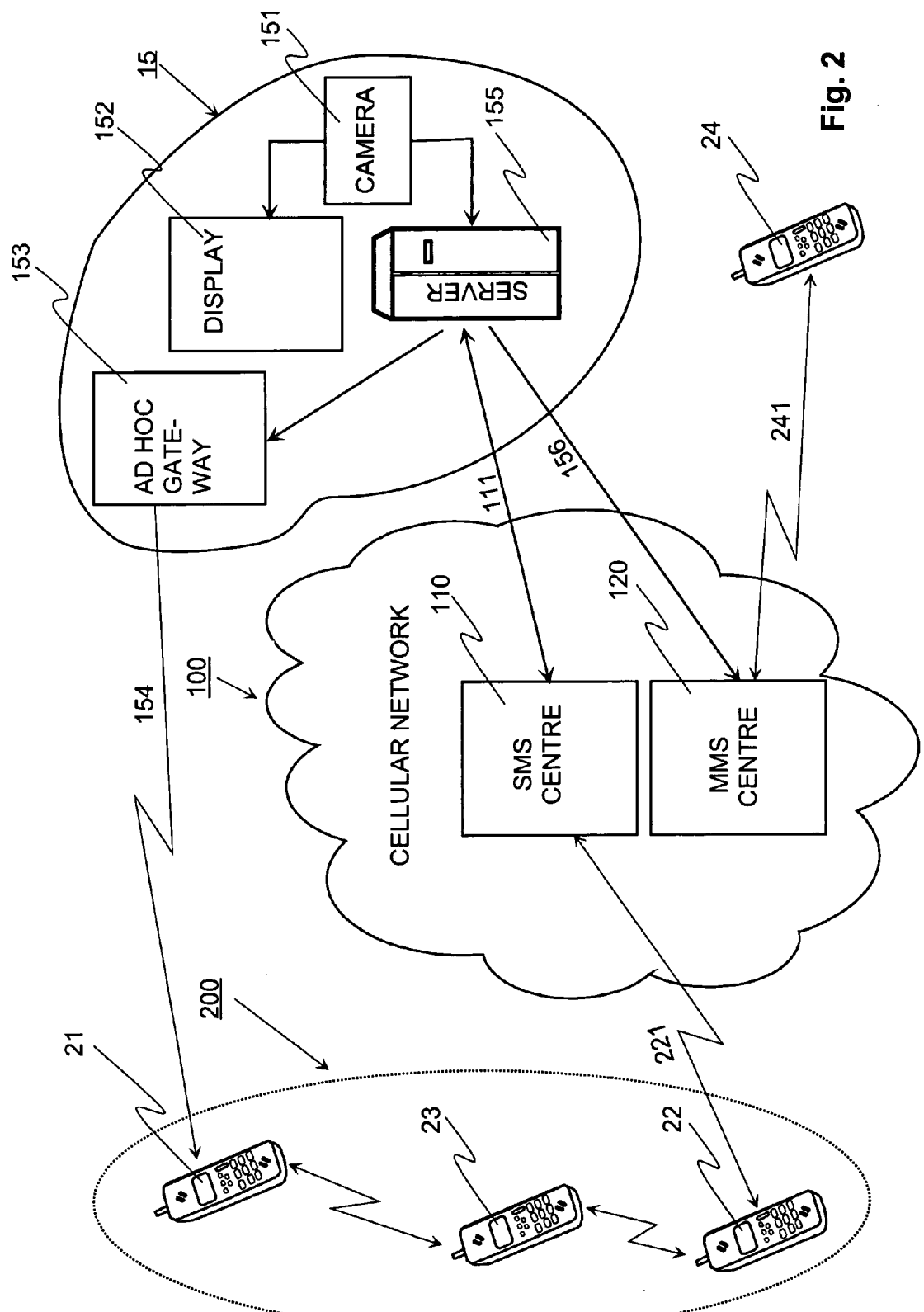
FIG. 2 shows another embodiment of a device arrangement according to the invention by way of example.

FIG. 2 shows an example of a device arrangement according to the second embodiment of the invention. In this embodiment, too, the party 15 organizing the mass event has multimedia production means at his disposal: camera(s) 151 by which the event is filmed, a display device 152 by which the filmed material is shown, and a multimedia server 155, into which the filmed/created multimedia data is saved.

In addition, in this embodiment the organizer of the mass event has at his disposal a gateway of a special data transfer network, called an ad hoc gateway 153. In this connection, a special data transfer network means a network 200, which is formed of the ad hoc gateway 153 and the terminal devices 21, 22 and 23. The ad hoc gateway 153 preferably transmits messages to terminal devices that are under its coverage area. Within the special data transfer network 200, transmission of messages can also take place between terminal devices belonging to the network or with their assistance. In the example of FIG. 2, a message from the terminal device 21 is transmitted to the terminal device 22 via a terminal device 23, if the ad hoc gateway 153 and the terminal device 21 are so far from terminal device 22 that a direct data transfer connection between them cannot be established. Some examples of such special data transfer networks are the WLAN networks (Wireless Local Area Network) and Bluetooth networks.

In this embodiment, the organizer of the event 15 provides a possibility to transmit multimedia data presented on the display device 152 via the special data transfer network 200 described above. Each terminal device 21, 22 and 23 connected to this special data transfer network 200 receives a message from the multimedia server 155 either directly through the ad hoc gateway 153 or some other terminal device belonging to this special data transfer network 200. If the participant wants to transmit the MMS message offered by the organizer 15 of the event, he sends a SMS message with his own terminal device to the multimedia server 155. The transmitted SMS message is conveyed to the cellular network 100 either directly from said terminal device or via some other terminal device belonging to the same special data transfer network 200. In the cellular network 100, the SMS message is directed to the SMS centre 110. From this SMS centre, via a data transfer connection 111, the message ends up in the multimedia server 155 of the organizer 15 of the event.

The multimedia server 155 processes and interprets the message it has received. It transmits via the data transfer connection 156 the MMS message ordered by the participant 10 to the MMS message centre 120 in the cellular network 100. From this MMS message centre, the MMS message is directed either via the same cellular network 100 or some other cellular network to a terminal device 24 wanted by the participant 10. In this example, the last connection passage 241 to the terminal device 24 is a wireless radio link.

As described in connection with FIG. 1, the selected MMS message can be conveyed to its destination by some other means than the cellular telephone network. In this embodiment, too, the Internet is only one example of an alternative data transfer network.

Figure 3:
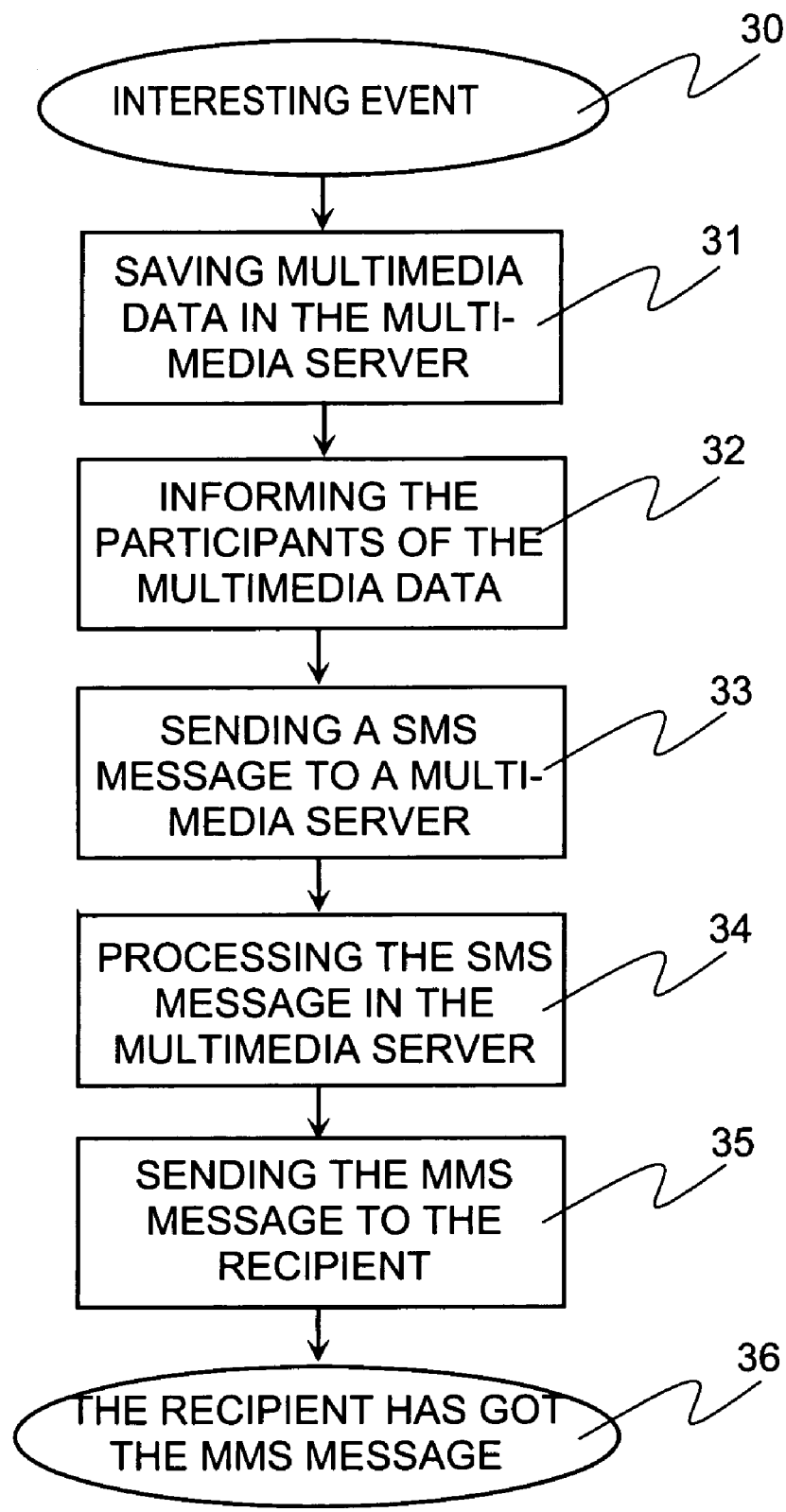
FIG. 3 shows the main steps of the method according to the invention as an exemplary flow chart.

FIG. 3 is an exemplary flow chart of the main steps of the media service offered in the arrangement according to the invention. The process starts from step 30, in which an event regarded as interesting by the organizer 15 of the event takes place. In step 31, the multimedia data associated with this event is saved in a multimedia server 155. The saved data can be text, sound, images or a video clip. In addition, the data can be processed before saving. Examples of processing like this are the use of slowdown in video or enlarging a part of a single image.

In step 32, the participants 10 of the event are informed of multimedia data available on the multimedia server 155. This can be done either by a message on the display device 152 or by transmitting a message about multimedia data via a special data transfer network 200 to suitable terminal devices.

In step 33, a participant 10 of the event sends with his terminal device 11 a SMS message, which is directed via a SMS centre 110 of a serving cellular network 100 to the multimedia server 155.

In step 34, the multimedia server 155 processes the SMS message received. It interprets which multimedia record in the server 155 is intended. Preferably, there is a large number of different multimedia records saved in this server 155. The server 155 also interprets whether the participant 10 wants to add some personal data to the MMS message to be transmitted.

When these interpretations have been made, the multimedia server 155 transmits in step 35 the ordered MMS message to a desired, advantageously a second terminal device. Naturally, it is also possible to order the multimedia record of the organizer 15 of the event to the participant's 10 own terminal device. In step 36, the message arrives at the desired terminal device, which can be, for example, a cellular telephone 12, 13 or a computer 14.

On the basis of the above described exemplary embodiments, it is obvious that the central idea of the invention is utilizing the multimedia server 155, by means of which it is possible to avoid the blocking of a single cell caused by MMS messages transmitted in connection with mass events. The operations required for implementing the invention can be advantageously implemented mostly by means of program applications saved in the multimedia server 155. The transmission of SMS messages from the cellular network 100 and the transmission of an MMS message or a POP message can be carried out with prior art procedures.

Some advantagous embodiments of the method and device according to the invention have been described above. However, the invention is not limited to the embodiments presented above. For example, instead of the SMS message used in the exemplary embodiments, it is possible to use any other message that can be used in cellular networks, which does not require high data transfer capacity in the serving cell. Within the scope of the inventive idea, it is also possible to transmit electronically transmissible products that are legally protected by copyright from a server which has the right to use and/or transmit the products. In addition, the inventive idea can be applied in many different ways within the scope defined by the attached claims.

The invention claimed is:

1. A method comprising:
    saving data used for a multimedia message in a multimedia server of an organizer of an event and connected to a wireless communications network, sending a short message service message from a first terminal device to said multimedia server for transmitting a multimedia message service message to a second terminal device, the multimedia message service message comprising multimedia data saved and provided by the organizer, and identified in said short message service message, forming the identified multimedia message service message in the multimedia server, and transmitting the multimedia message from the multimedia message service server to the second terminal device specified by the first terminal device in said short message service message.

2. The method according to claim 1, wherein data saved as said multimedia data comprises at least one of images, high-class sound, video clips, or live video data.

3. The method according to claim 1, wherein the multimedia data to be saved in the multimedia server is also presented in the event with a separate display device.

4. The method according to claim 3, wherein instructions for defining and sending a multimedia message are transmitted via a special data transfer network to terminal devices connected to said special data transfer network.

5. A system comprising:
a wireless communications network;
a first terminal device of the wireless communications network;
a second terminal device of the wireless communications network; and
a multimedia server connected to the wireless communications network, wherein multimedia data used for a multimedia message service message has been saved in the multimedia server by an organizer of an event,
wherein a short message service message sent by the first terminal device to said multimedia server has been arranged to direct the multimedia server to compose the multimedia message service message to be transmitted to the second terminal device,
wherein the multimedia server has been arranged to form the multimedia message service message identified by the short message service message sent by the first terminal device, and
wherein the multimedia server has been arranged to transmit the multimedia message service message composed by it to the second terminal device specified by the first terminal device in said short message service message.

6. The system according to claim 5, wherein the data saved as said multimedia data comprises at least one of images, high-class sound, video clips or live video data.

7. The system according to claim 5, wherein the multimedia data to be saved in the multimedia server is also arranged to be presented in an event with a separate display device.

8. The system according to claim 7, wherein instructions for defining and sending another multimedia message are arranged to be transmitted via a special data transfer network to terminal devices connected to said special data transfer network.

9. A multimedia server comprising:
a memory for saving multimedia data by an organizer of an event;
a receiver configured to receive a short message service message from a first terminal device on a wireless communications network, in which the short message service message specifies a multimedia message service message to be transmitted to a second terminal device on the wireless communications network, the multimedia message service message comprising multimedia data;
a multimedia element configured to compose the multimedia message service message specified by the short message service message; and
a transmitter configured to transmit the composed multimedia message service message to said second terminal device using the wireless communications network.

10. The multimedia server according to claim 9, wherein the multimedia data saved in the multimedia server has been produced in the event.

11. The multimedia server according to claim 9, wherein the multimedia server comprises a memory for saving for at least one of the following media: graphical presentation, image, high-class sound, video clip or live video.

12. The multimedia server according to claim 9, wherein the transmitter for transmitting the composed multimedia message to the second terminal device comprises a transmitter for a multimedia message service MMS message.

13. The multimedia server according to claim 9, wherein the message from the first terminal device includes comments to be added to the multimedia message service message.

* * * * *